United States Patent
Yang

(10) Patent No.: US 9,651,800 B2
(45) Date of Patent: May 16, 2017

(54) TEMPLE AND EYEWEAR HAVING THE SAME

(71) Applicant: ALL-LOGIC INT. CO., LTD., Tainan (TW)

(72) Inventor: Shun-Tien Yang, Tainan (TW)

(73) Assignee: ALL-LOGIC INT. CO., LTD., Tainan (TW)

(*) Notice: Subject to any disclaimer, the term of this patent is extended or adjusted under 35 U.S.C. 154(b) by 0 days.

(21) Appl. No.: 15/005,284

(22) Filed: Jan. 25, 2016

(65) Prior Publication Data

US 2016/0357028 A1 Dec. 8, 2016

(30) Foreign Application Priority Data

Jun. 3, 2015 (TW) .............................. 104208804 U

(51) Int. Cl.
*G02C 5/22* (2006.01)

(52) U.S. Cl.
CPC .......... *G02C 5/2254* (2013.01); *G02C 5/2209* (2013.01); *G02C 2200/22* (2013.01)

(58) Field of Classification Search
CPC .......... G02C 5/16; G02C 5/2209; G02C 5/06; G02C 5/22; G02C 5/006

USPC ............ 351/153, 119, 111; 16/228; D16/335
See application file for complete search history.

(56) References Cited

U.S. PATENT DOCUMENTS

| | | | | |
|---|---|---|---|---|
| 5,059,017 A * | 10/1991 | Bennato | .................. | G02C 5/008 16/228 |
| 5,386,254 A * | 1/1995 | Kahaney | ................ | G02C 3/003 351/116 |
| 7,055,953 B1 * | 6/2006 | Yves | ...................... | G02C 5/008 16/228 |

* cited by examiner

*Primary Examiner* — Hung Dang
(74) *Attorney, Agent, or Firm* — Kirton McConkie; Evan R. Witt

(57) ABSTRACT

An eyewear includes a lens unit and two temples each having a fixed segment, a movable segment, at least one connecting portion and a flexible elastic portion. For each temple, the connecting portion interconnects the fixed segment and the movable segment. The movable segment is pivotable between an open position and a folded position. The elastic portion is integrally formed with and interconnects the fixed segment and the movable segment. When the movable segment is moved between the open position and the folded position, the elastic portion is deformed for generating a restoring force to drive the movable segment to pivot to one of the open position and the folded position from the other one of the open position and the folded position.

20 Claims, 10 Drawing Sheets

TEMPLE AND EYEWEAR HAVING THE SAME

CROSS-REFERENCE TO RELATED APPLICATION

This application claims priority of Taiwanese Patent Application No. 104208804, filed on Jun. 3, 2015.

FIELD

The disclosure relates to an eyewear, more particularly to an eyewear having a frame and two foldable temples that can be integrally formed with the frame.

BACKGROUND

A conventional eyewear includes a frame, two lenses that are disposed in the frame, and two temples that are respectively connected to two lateral sides of the frame. The frame includes two rearward-extending ribs that extend rearwardly and respectively from the lateral sides of the frame. Each of the temples has a front end surface, and two frontward-extending ribs that extend from the front end surface, that are spaced apart in a top-bottom direction, and that sandwich one of the rearward-extending ribs therebetween. Each of the temples is pivotally connected to the frame by a screw that extends vertically through the frontward-extending ribs of a respective one of the temples and a corresponding one of the rearward-extending ribs, such that the temples are pivotable relative to the frame. Therefore, a relatively compact profile of the conventional eyewear that is relatively convenient to carry or store is provided. However, since the screws are relatively small in size, it may be time-consuming to assemble the screws when manufacturing the eyewear. Moreover, the screws add weight to the conventional eyewear, which may be undesirable for a wearer. In addition, the screws may be loosen and may even fall out of the conventional eyewear after numerous folding and unfolding movements of the temples.

SUMMARY

Therefore, an object of the disclosure is to provide an eyewear that can alleviate at least one of toe drawbacks of the prior art.

According to one aspect of the disclosure, the eyewear includes a lens unit and two temples.

Each of the temples includes a fixed segment, a movable segment, at least one connecting portion and an elastic portion.

The fixed segment is fixedly connected to the lens unit. The movable segment has a proximal end proximate to the fixed segment, and a distal end distal from the fixed segment. The connecting portion is flexible, and is integrally formed with and interconnects the fixed segment and the proximal end of the movable segment, such that the movable segment is pivotable relative to the fixed segment between an open position, where the eyewear can be worn, and a folded position, where the distal end of the movable segment is proximate to the lens unit. The elastic portion is flexible, and is integrally formed with and interconnects the fixed segment and the movable segment such that, when the movable segment is moved between the open position and the folded position, the elastic portion is deformed for generating a restoring force to drive the movable segment to pivot to one of the open position and the folded position from the other one of the open position and the folded position.

Another object of the disclosure is to provide a temple that can alleviate at least one of the drawbacks of the prior art.

According to another aspect of the disclosure, the temple is for an eyewear that includes a lens unit having two lateral sides. The temple includes a fixed segment, a movable segment, at least one connecting portion and an elastic portion.

The fixed segment is adapted to be fixedly connected to one lateral side of the lens unit. The movable segment has a proximal end proximate to the fixed segment, and a distal end distal from the fixed segment. The connecting portion is flexible, and is integrally formed with and interconnects the fixed segment and the proximal end of the movable segment, such that the movable segment is pivotable relative to the fixed segment between an open position, where the eyewear can be worn, and a folded position, where the distal end of the movable segment is proximate to the lens unit. The elastic portion is flexible, and is integrally formed with and interconnects the fixed segment and the movable segment, such that when the movable segment is moved between the open position and the folded position, the elastic portion is deformed for generating a restoring force to drive the movable segment to pivot to one of the open position and the folded position from the other one of the open position and the folded position.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
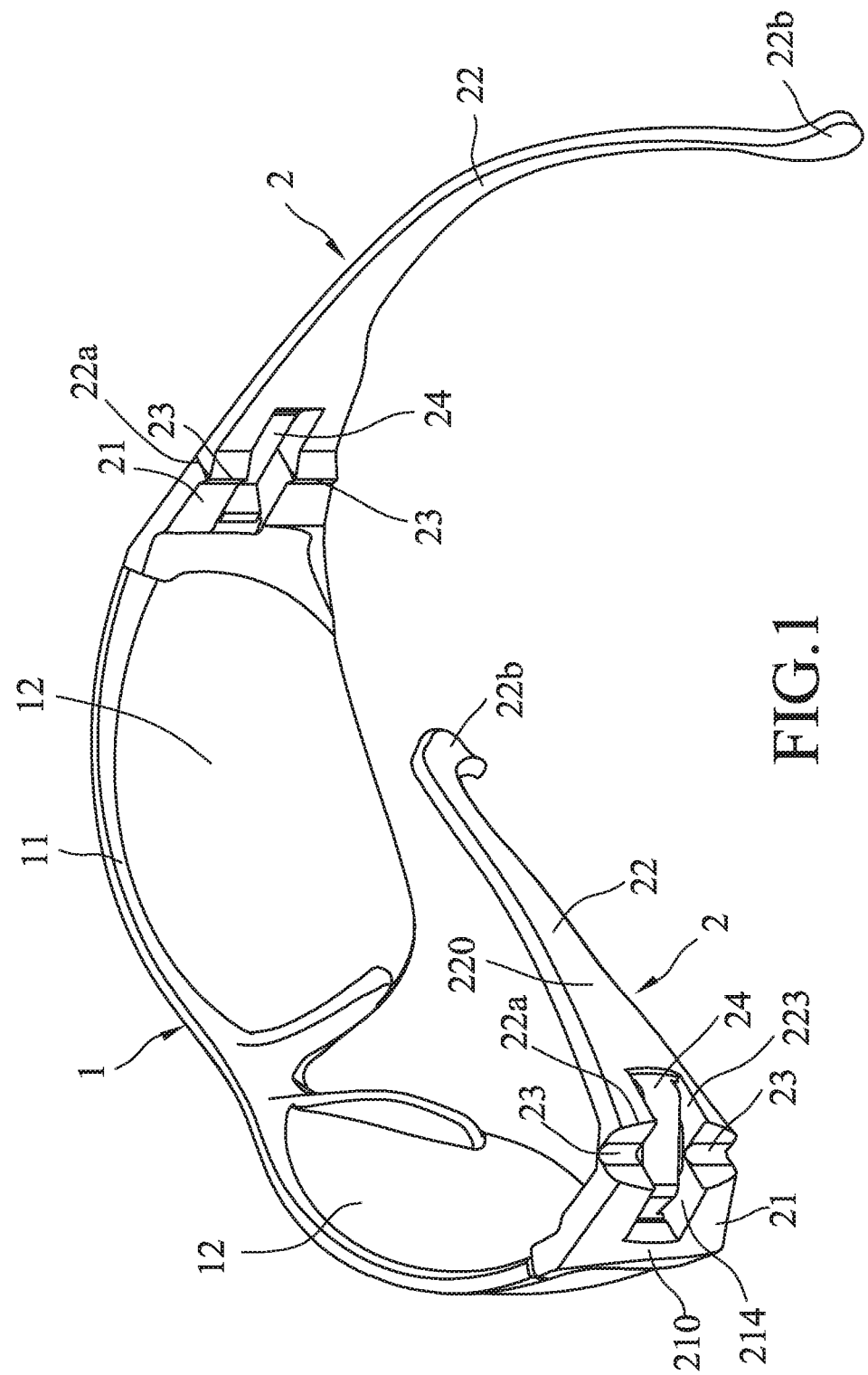
FIG. 1 is a perspective view illustrating a first embodiment of an eyewear according to the disclosure.

Before the disclosure is described in greater detail, it should be noted that like elements are denoted by the same reference numerals throughout the disclosure.

Figure 2:
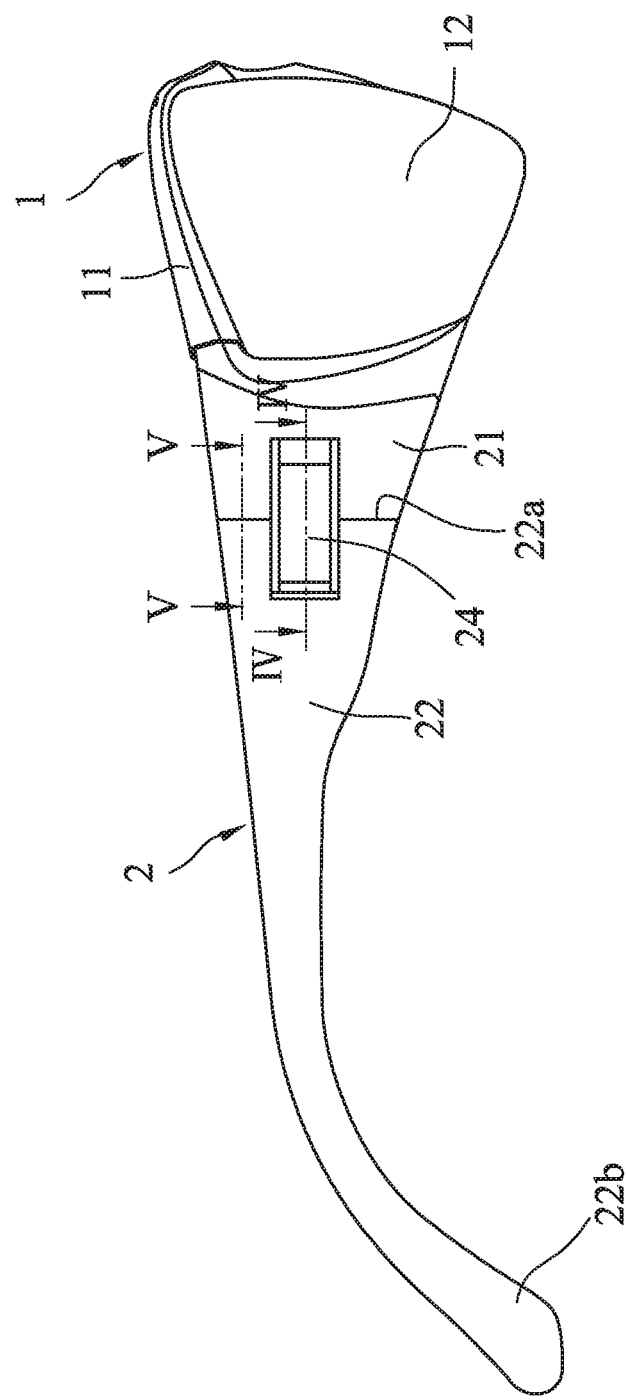
FIG. 2 is a side view of the first embodiment.
Figure 3:
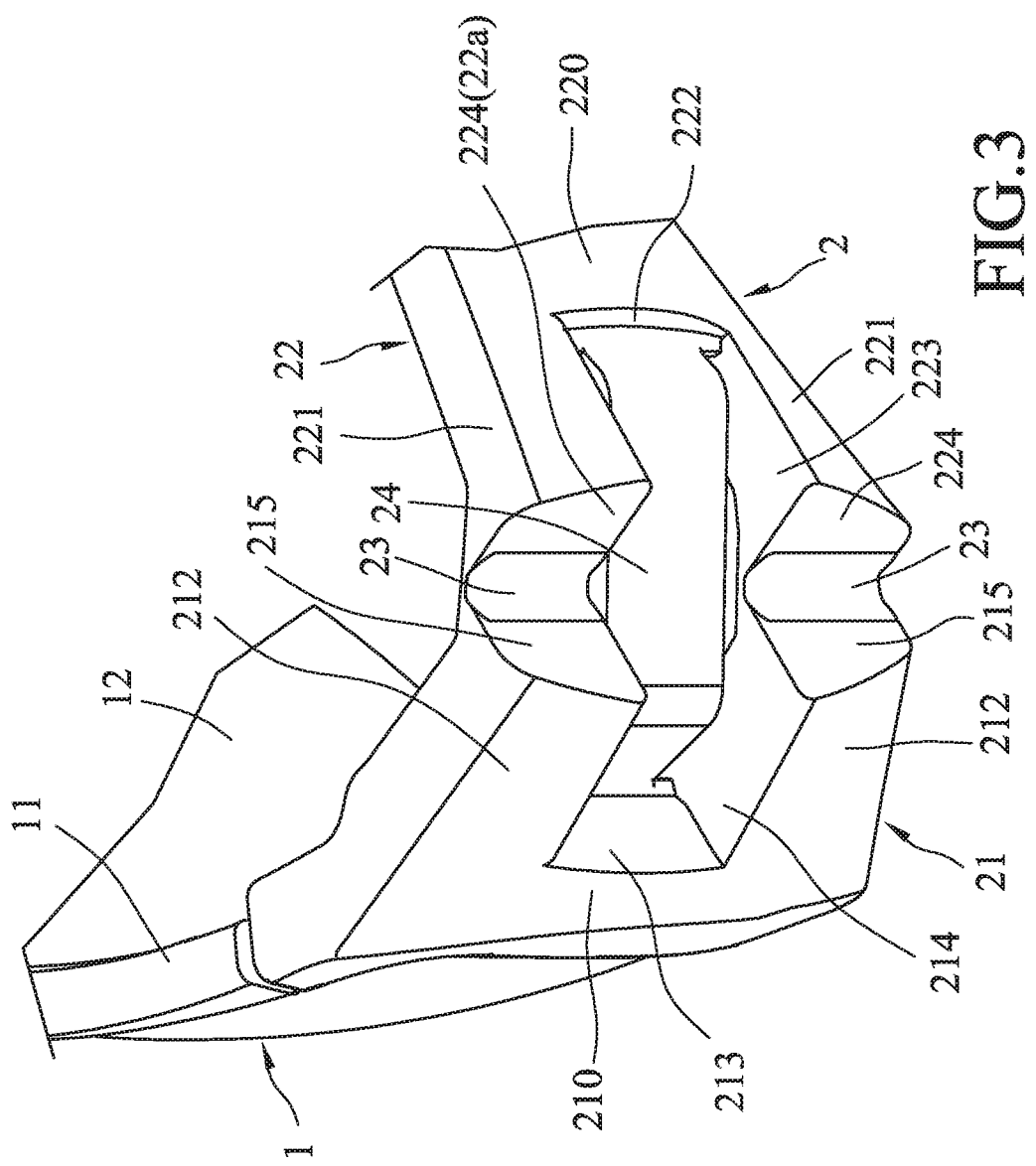
FIG. 3 is an enlarged fragmentary perspective view of the first embodiment, illustrating a temple of the eyewear connecting with a frame of the eyewear.

Referring to FIGS. 1 to 3, the first embodiment of an eyewear according to the present disclosure includes a lens unit 1 and two temples 2.

In this embodiment, the lens unit 1 and the temples 2 are made of, but not limited to, polypropylene (PP) or polyamide (e.g., nylon).

The lens unit 1 includes a frame 11 and two lenses 12 that respectively correspond to left and right eyes of a wearer. The frame 11 and the lenses 12 are integrally formed in this embodiment. Alternatively, the frame 11 and the lenses 12 may be formed separately and then assembled as desired. In other variations of the embodiment, the lens unit 1 may include a frame 11, and one relatively large lens that corresponds in position to both of the left and right eyes of the wearer, or the lens unit 1 may include only one lens that corresponds in position to one of the left and right eyes of the wearer. Since the feature of the present disclosure does not reside in the structure of the lens unit 1, the scope of the present disclosure should not be limited thereto.

Each of the temples 2 includes a fixed segment 21, a movable segment 22, two connecting portions 23 and an elastic portion 24. Since the temples 2 are similar in structure, only one of the temples 2 will be described in detail hereinafter for the sake of brevity.

For each temple 2, the fixed segment 21 is fixedly connected to the lens unit 1, and is formed with an engaging groove 211 (see FIG. 4) that engages a lateral edge of the lens unit 1.

The movable segment 22 has a proximal end 22a proximate to the fixed segment 21, and a distal end 22b distal from the fixed segment 21.

As illustrated in FIG. 3, the fixed segment 21 includes a main body 210 that has a rear end surface 213, and two rearward-extending ribs 212 that are spaced apart from each other in a top-bottom direction, that extend rearwardly from the rear end surface 213 of the main body 2110 of the fixed segment 21, and that cooperate with the main body 210 of the fixed segment 21 to define a front groove 214 thereamong. The movable segment 22 includes a main body 220 that has a front end surface 222, and two frontward-extending ribs 221 that are spaced apart from each other in the top-bottom direction, that extend forwardly from the front end surface 222 of the main body 220 of the movable segment 22, and that cooperate with the main body 220 of the movable segment 22 to define a rear groove 223 thereamong.

The connecting portions 23 are spaced apart from each other in the top-bottom direction. Each of the connecting portions 23 is flexible, and is integrally formed with and interconnects the fixed segment 21 and the proximal end 22a of the movable segment 22, such that the movable segment 22 is pivotable relative to the fixed segment 21 between an open position, where the eyewear can be worn, and a folded position, where the distal end 22b of the movable segment 22 is proximate to the lens unit 1. In greater detail, each of the connecting portions is integrally formed with and interconnects a respective one of the rearward-extending ribs 212 of the fixed segment 21 and a corresponding one of the frontward-extending ribs 221 of the movable segment 22.

Figure 5:
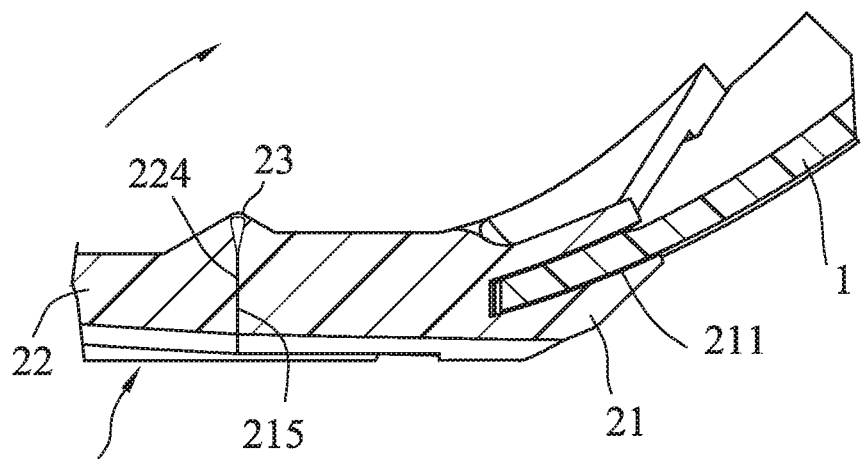
FIG. 5 is a fragmentary sectional view of the first embodiment taken along line V-V in FIG. 2, illustrating the movable segment of the temple at the open position.

Referring to FIGS. 3 and 5, each of the rearward-extending ribs 212 of the fixed segment 21 has a rear contacting surface 215 that faces rearwardly. Each of the frontward-extending ribs 221 of the movable segment 22 has a front contacting surface 224 that is in contact with and parallel to the rear contacting surface 215 a corresponding one of the rearward-extending ribs 212 when the movable segment 22 is at the open position. In this embodiment, the front contacting surface 224 of each of the frontward-extending ribs 221 is registered with the rear contacting surface 215 of the corresponding one of the rearward-extending ribs 212 when the movable segment 22 is at the open position.

As shown in FIG. 3, each of the connecting portions 23 interconnects an inner side of the rear contacting surface 215 of a corresponding one of the rearward-extending ribs 212 and an inner side of the front contacting surface 224 of a corresponding one of the frontward-extending ribs 221.

Each of the connecting portions 23 has opposite inner and outer surfaces. A distance between the inner and outer surfaces is designed to range from 0.3 mm to 1 mm so as to provide adequate strength for bridging the fixed segment 21 and the movable segment 22 and for pivotal movement of the movable segment 22.

It should be noted that in other variations of the embodiment, the number of the connecting portions 23 may be varied, as desired.

Figure 4:
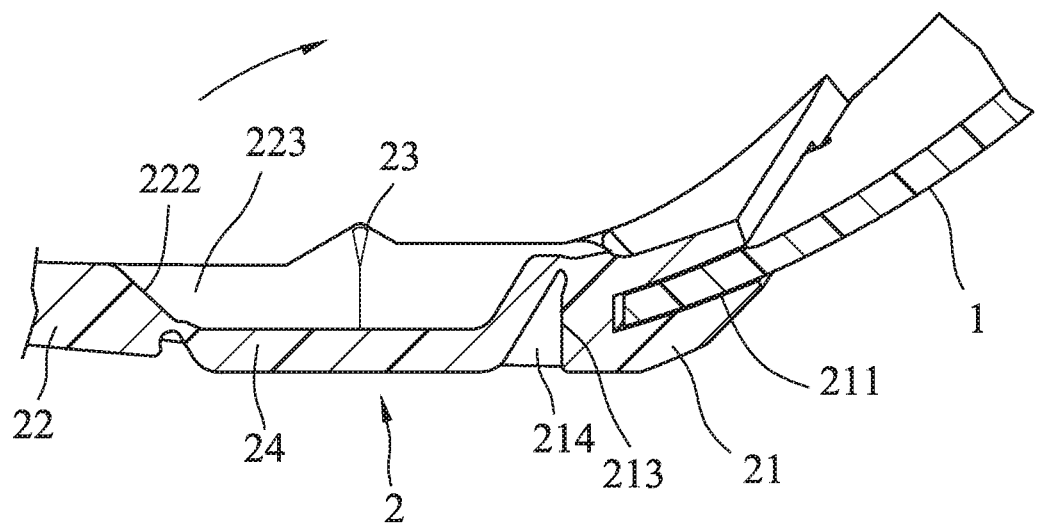
FIG. 4 is a fragmentary sectional view of the first embodiment taken along line in FIG. 2, illustrating a movable segment of the temple at an open position.

With additional reference to FIG. 4, the elastic portion 24 is flexible, and is located between the connecting portions 23. The elastic portion 24 is integrally formed with and interconnects the rear end surface 213 of the fixed segment 21 and the front end surface 222 of the movable segment 22, and spans the front groove 214 and the rear groove 223. More specifically, the elastic portion 24 interconnects an inner side of the rear end surface 213 of the fixed segment 21 and an outer side of the front end surface 222 of the movable segment 22. By this way, when the movable segment 22 is moved between the open position and the folded position, the elastic portion 24 is deformed for generating a restoring force to drive the movable segment 22 to pivot to one of the open position and the folded position from the other one of the open position and the folded position.

Figure 6:
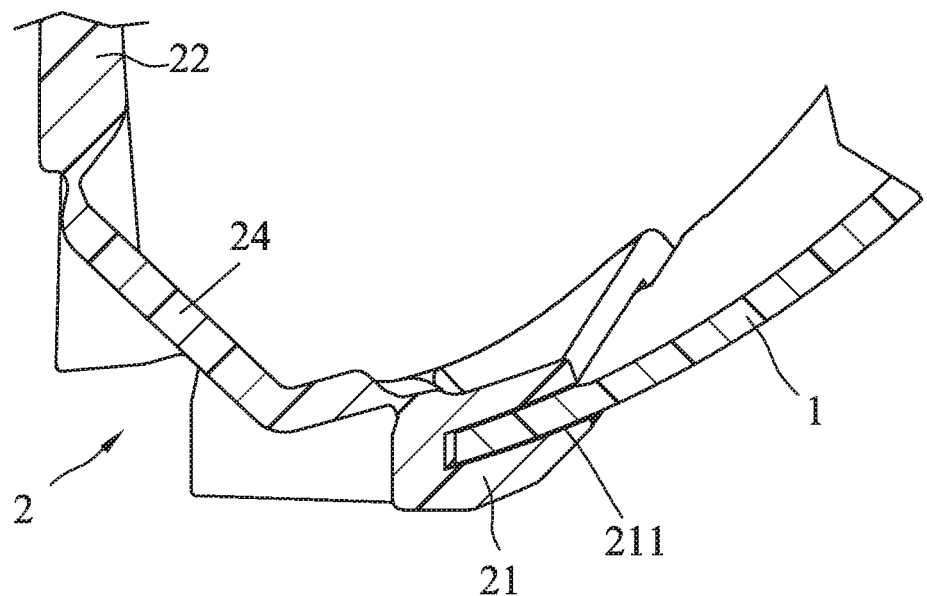
FIG. 6 is a view similar to FIG. 4, in which the movable segment of the temple of the first embodiment is at a folded position.
Figure 7:
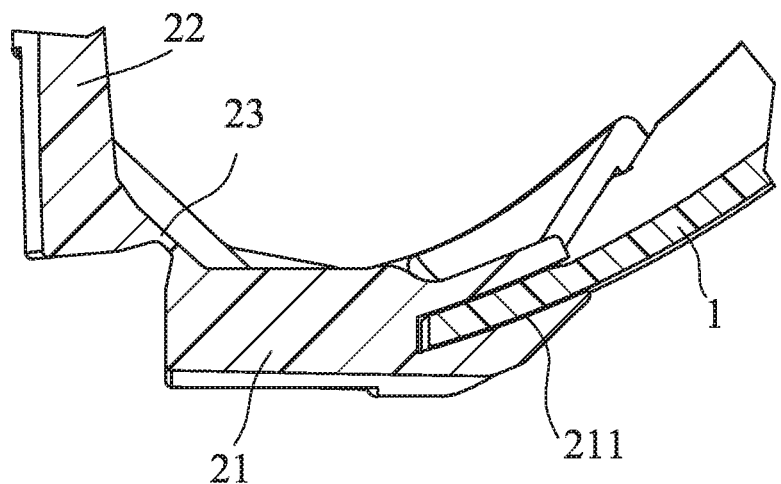
FIG. 7 is a view similar to FIG. 5, in which the movable segment of the temple of the first embodiment is at the folded position.

Referring to FIGS. 1, 6 and 7 when the movable segment 22 is moved from the open position to the folded position, each of the connecting portions 23 serves as a pivot point for the distal end 22b of the movable segment 22 to pivot toward the lens unit. During such transition, the elastic portion 24 is deformed, slightly stretched, and generates the restoring force to drive the movable segment 22 to pivot to the folded position from the open position. The configuration of the elastic portion 24 facilitates the movement of the movable segment 22 between the open position and the folded position.

To sum up, the fixed segment 21, the movable segment 22, the connecting portions 23 and the elastic portion 24 of each of the temples 2 are integrally formed and need not to be assembled, thereby saving manufacturing cost of the eyewear. Furthermore, since the eyewear of the present disclosure is free of screws, the problems of the screws becoming loose or falling out, which may be encountered with the conventional eyewear, are eliminated.

Figure 8:
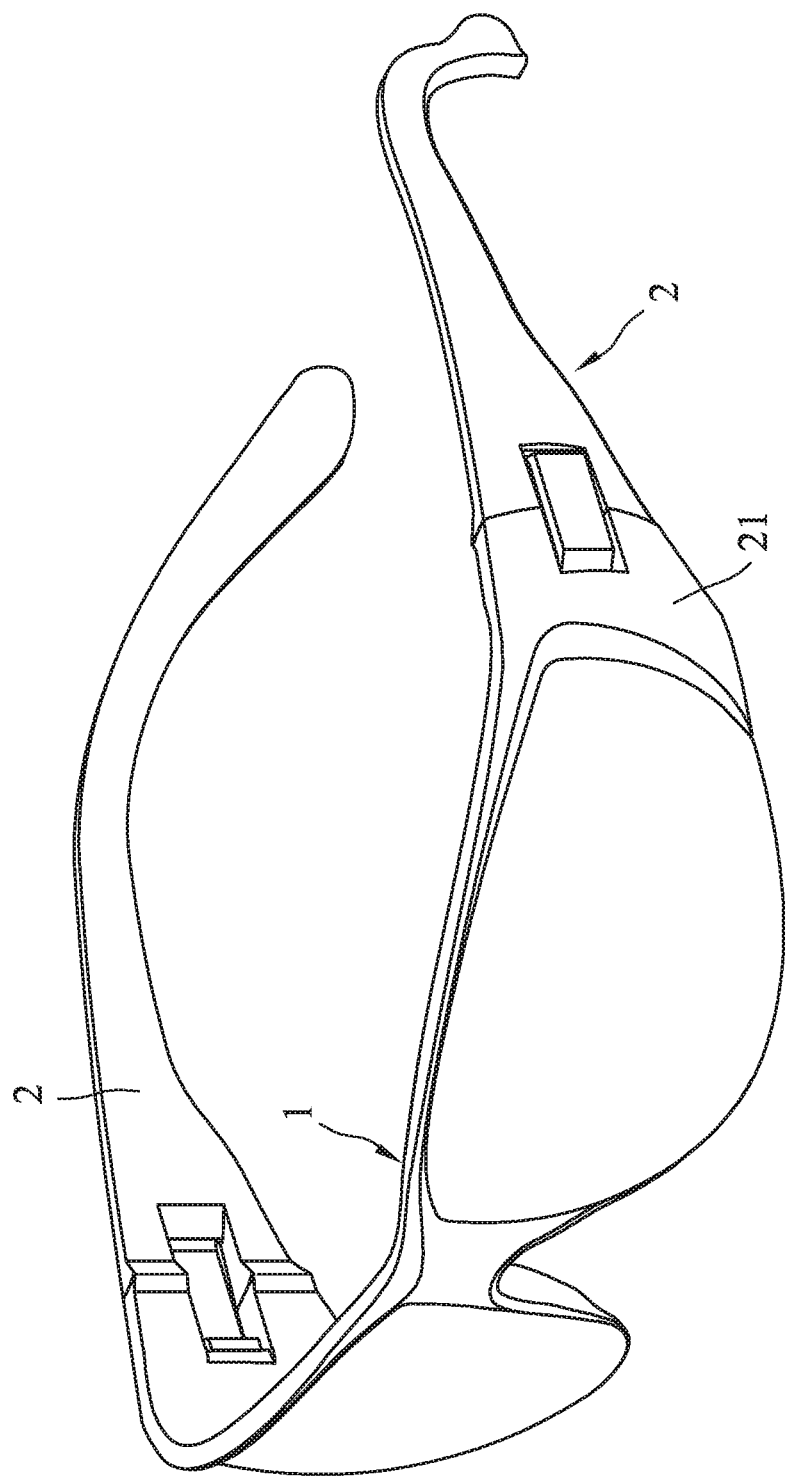
FIG. 8 is a perspective view illustrating a second embodiment of the eyewear according to the disclosure.
Figure 9:
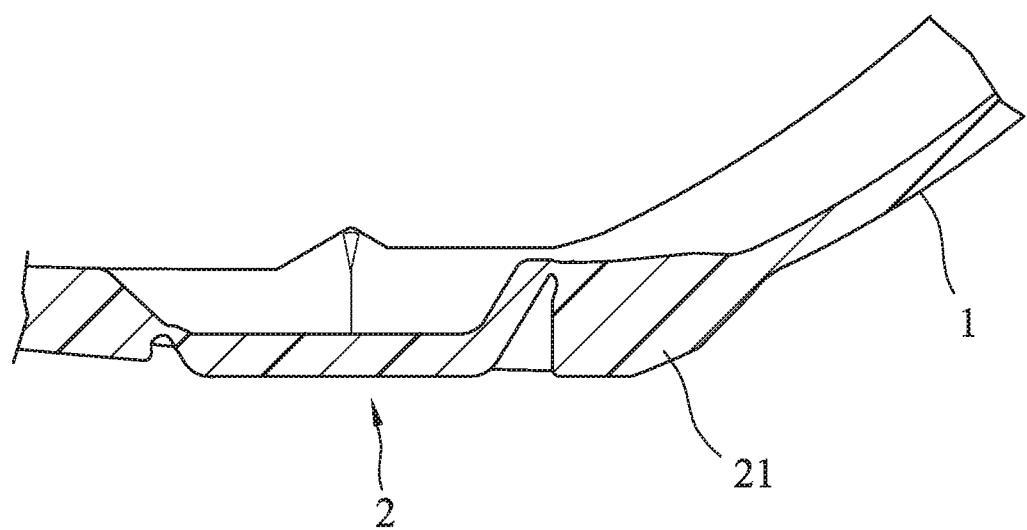
FIG. 9 is a fragmentary sectional view of the second embodiment, illustrating the temple and a lens unit.

Referring to FIGS. 8 and 9, a second embodiment of the eyewear according to the disclosure is similar to the first embodiment, the difference between the first and second embodiments residing in that the lens unit 1 and the fixed segments 21 of the temples 2 of the second embodiment are integrally formed. In this embodiment, the lens unit 1 and the fixed segments 21 are integrally formed using injection molding. As such, assembly cost of the eyewear and manufacturing cost for the eyewear are reduced.

Figure 10:
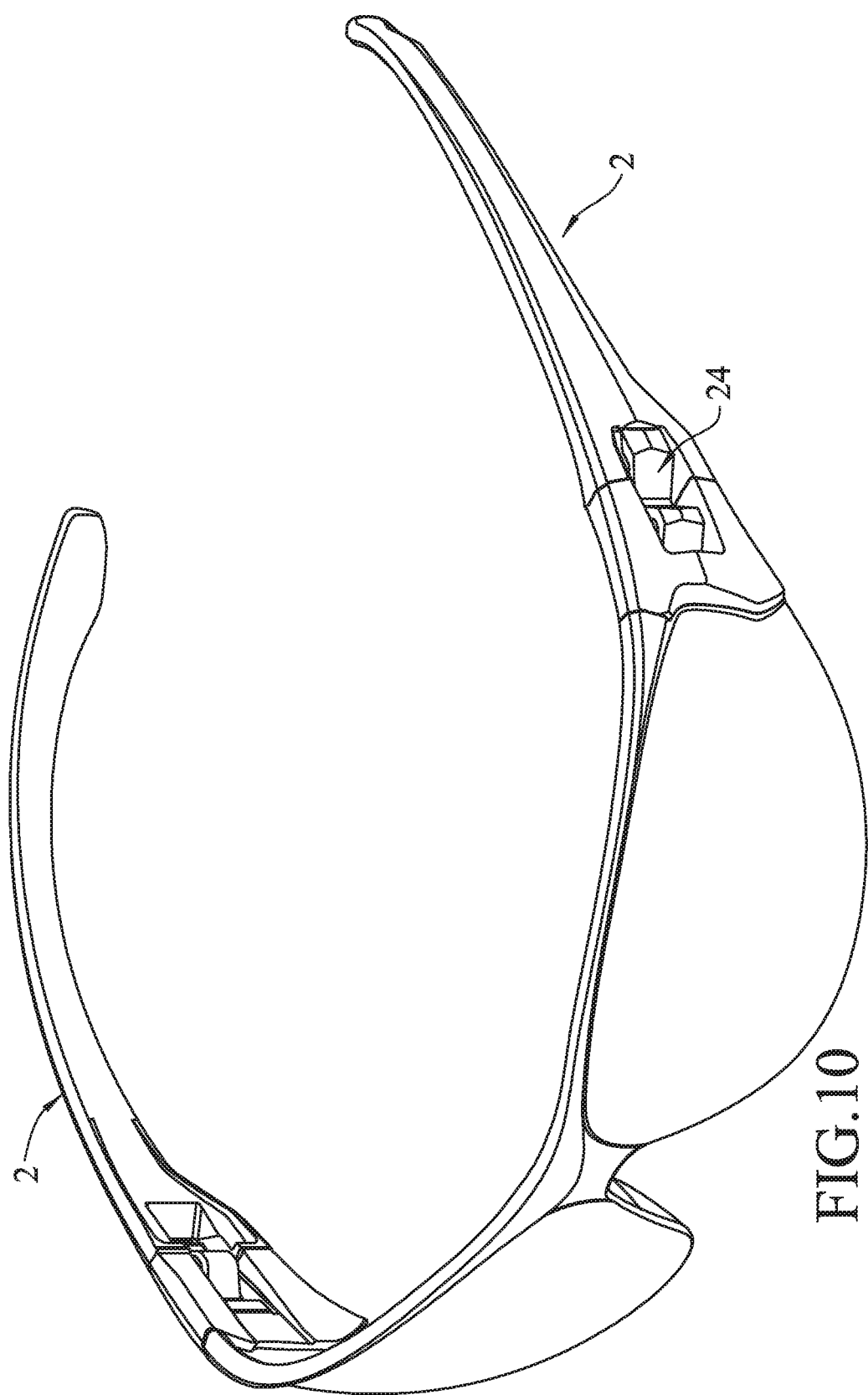
FIG. 10 is a perspective view illustrating a third embodiment of the eyewear according to the disclosure.
Figure 11:
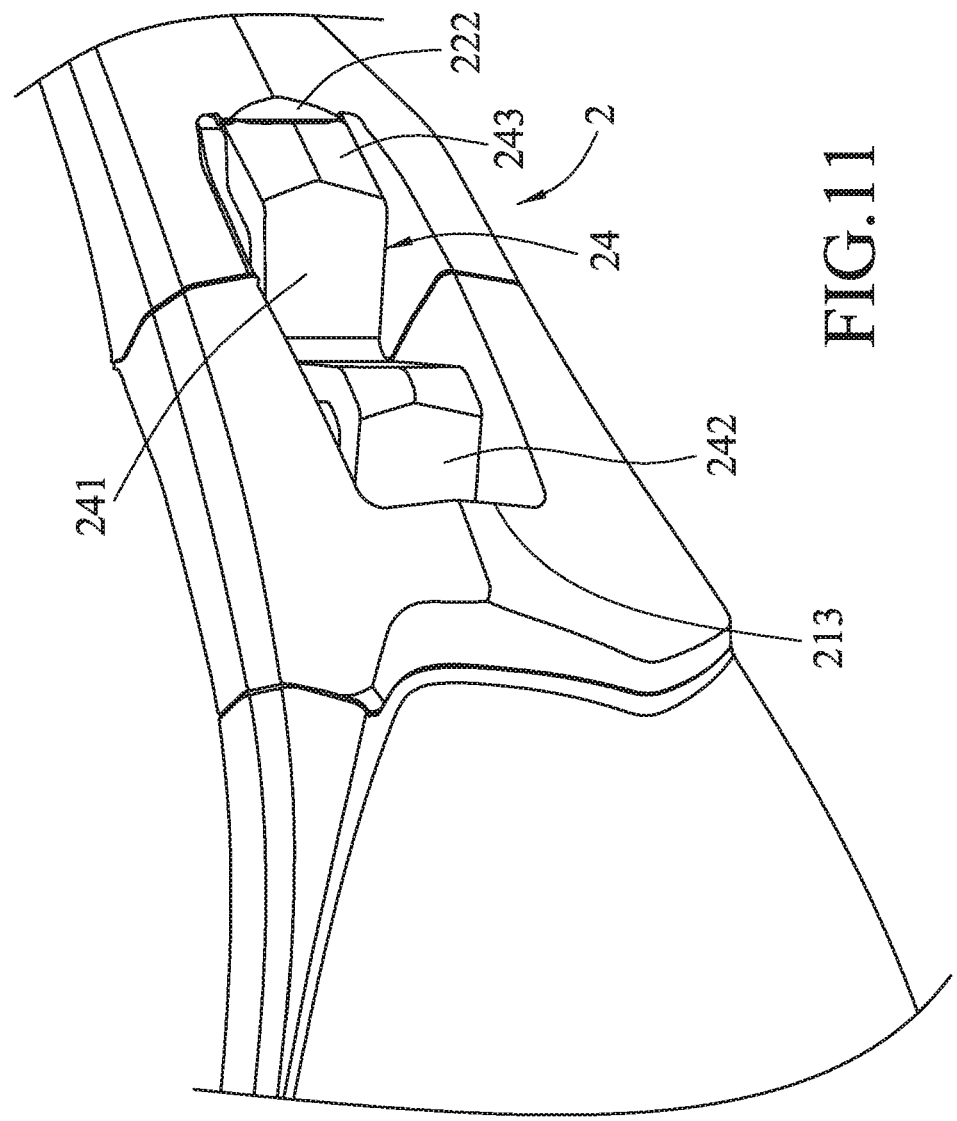
FIG. 11 is an enlarged fragmentary perspective view of the third embodiment, illustrating an elastic portion of the temple.
Figure 12:
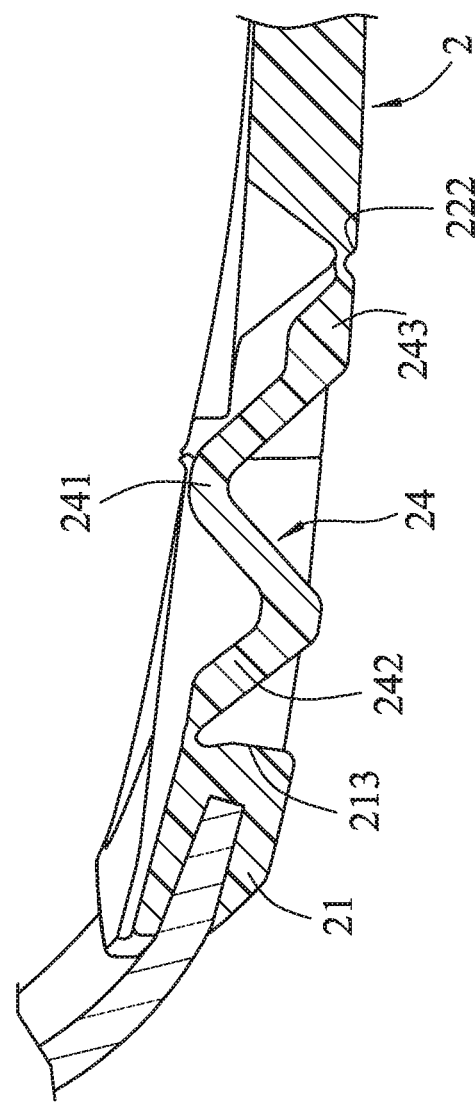
FIG. 12 is a fragmentary sectional view of the third embodiment, illustrating the elastic portion of the temple.

Referring to FIGS. 10 to 12, a third embodiment of the eyewear according to the disclosure is similar to the first embodiment, the difference therebetween residing in that the elastic portion 24 of each of the temples 2 is configured as a wavy strip. More specifically, for each of the temples 2, the elastic portion 24 has two opposite end sections 242, 243, and a middle section 241 that interconnects the end sections 242, 243. As best shown in FIG. 12, one of the end sections 242 extends toward and is connected to the inner side of the rear end surface 213 of the fixed segment 21. The other one of the end sections 243 extends toward and is connected to the outer side of the front end surface 222 of the movable segment 22. The middle section 241 has a V-shaped cross section which points toward an inner surface of the movable segment 22. Such wavy configuration improves elasticity of the elastic portion 24 and prevents the elastic portion 24 from snapping and breaking apart when the movable segment 22 is moved between the open position and the folded position.

It is worth mentioning that in other variations of the embodiment, the cross section of the middle section 241 may be, but not limited to, inverted V-shaped, W-shaped, or in a wavy form.

Reference in the specification to "one embodiment," "an embodiment," "a first embodiment," "a second embodiment" and so forth means that a particular feature, structure, or characteristic described in connection with the embodiment may be included in at least an implementation. The appearances of the phrase "in one embodiment," "in this embodiment", "in the embodiment" in various places in the specification may or may not be all referring to the same embodiment. Various features, aspects, and exemplary embodiments have been described herein. While various features and aspects may have been described with reference to different drawings depicting varying specific embodiments, the features, aspects, and exemplary embodiments are susceptible to combination with one another as well as to variation and modification, as will be understood by those having ordinary skill in the art.

This disclosure is not limited to the disclosed exemplary embodiments but is intended to cover various arrangements included within the spirit and scope of the broadest interpretation so as to encompass all such modifications and equivalent arrangements.

What is claimed is:

1. An eyewear comprising:
   a lens unit;
   two temples each including
      a fixed segment that is fixedly connected to said lens unit,
      a movable segment that has a proximal end proximate to said fixed segment, and a distal end distal from said fixed segment,
      at least one connecting portion, which is flexible, which is integrally formed with and interconnects said fixed segment and said proximal end of said movable segment, such that said movable segment is pivotable relative to said fixed segment between an open position, where said eyewear can be worn, and a folded position, where said distal end of said movable segment is proximate to said lens unit, and
      an elastic portion that is flexible, that is spaced apart from said connecting portion in a top-bottom direction and that is integrally formed with and interconnects said fixed segment and said movable segment such that, during movement of said movable segment from the open position to the folded position, said elastic portion is deformed and stretched for generating a restoring force to drive said movable segment to pivot to the folded position from the open position, and during movement of said movable segment from the folded position to the open position, said elastic portion is deformed and stretched for generating a restoring force to drive said movable segment to pivot to the open position from the folded position.

2. The eyewear as claimed in claim 1, wherein said elastic portion of each of said temples is configured as a wavy strip.

3. The eyewear as claimed in claim 2, wherein said elastic portion of each of said temples has two opposite end sections that are respectively connected to said fixed segment and said movable segment, and a middle section that interconnects said end sections and that has a V-shaped cross section.

4. The eyewear as claimed in claim 1, wherein said fixed segment of each of said temples is formed with an engaging groove that engages a lateral edge of said lens unit.

5. The eyewear as claimed in claim 1, wherein each of said temples includes two of said connecting portions that are spaced apart from each other in the top-bottom direction, that are integrally formed with and interconnect said fixed segment and said movable segment, said elastic portion being located between said connecting portions.

6. The eyewear as claimed in claim 1, wherein said fixed segment of each of said temples and said lens unit are integrally formed.

7. The eyewear as claimed in claim 1, wherein:
   said fixed segment of each of said temples includes a main body that has a rear end surface, and two rearward-extending ribs that are spaced apart from each other in the top-bottom direction, that extend rearwardly from said rear end surface of said main body of said fixed segment, and that cooperate with said main body of said fixed segment to define a front groove thereamong;
   said movable segment of each of said temples includes a main body that has a front end surface, and two frontward-extending ribs that are spaced apart from each other in the top-bottom direction, that extend forwardly from said front end surface of said main body of said movable segment, and that cooperate with said main body of said movable segment to define a rear groove thereamong; and
   said elastic portion of each of said temples interconnects said rear end surface of said fixed segment of a respective one of said temples and said front end surface of said movable segment of a corresponding one of said temples, and spans said front groove and said rear groove of the corresponding one of said temples.

8. The eyewear as claimed in claim 7, wherein each of said temples includes two of said connecting portions that are spaced apart from each other in the top-bottom direction, each of said connecting portions being integrally formed with and interconnecting one of said rearward-extending ribs of said fixed segment of a corresponding one of said temples and an adjacent one of said frontward-extending ribs of said movable segment of the corresponding one of said temples.

9. The eyewear as claimed in claim 8, wherein each of said rearward-extending ribs has a rear contacting surface that faces rearwardly, each of said frontward-extending ribs having a front contacting surface that is in contact with and parallel to said rear contacting surface of a corresponding one of said rearward-extending ribs of said fixed segment of a corresponding one of said temples when said movable segment of the corresponding one of said temples is at the open position.

10. The eyewear as claimed in claim 9, wherein each of said connecting portions interconnects an inner side of said rear contacting surface of a corresponding one of said rearward-extending ribs and an inner side of said front contacting surface of a corresponding one of said frontward-extending ribs of said movable segment of a corresponding one of said temples.

11. The eyewear as claimed in claim 10, wherein each of said connecting portions has opposite inner and outer surfaces, a distance between said inner and outer surfaces ranging from 0.3 mm to 1 mm.

12. The eyewear as claimed in claim 7, wherein said elastic portion of each of said temples interconnects an inner side of said rear end surface of said fixed segment of a corresponding one of said temples and an outer side of said front end surface of said movable segment of the corresponding one of said temples.

13. A temple for an eyewear, the eyewear includes a lens unit having two lateral sides, said temple comprising:
   a fixed segment that is adapted to be fixedly connected to one of the lateral sides of the lens unit;
   a movable segment that has a proximal end proximate to said fixed segment, and a distal end distal from said fixed segment;
   at least one connecting portion, which is flexible, which is integrally formed with and interconnecting said fixed segment and said proximal end of said movable segment, such that said movable segment is pivotable relative to said fixed segment between an open position, where the eyewear can be worn, and a folded position, where said distal end of said movable segment is proximate to said lens unit; and
   an elastic portion that is flexible, that is spaced apart from said connecting portion in a top-bottom direction, and that is integrally formed with and interconnects said fixed segment and said movable segment, such that during movement of said movable segment from the open position to the folded position, said elastic portion is deformed and stretched for generating a restoring force to drive said movable segment to pivot to the folded position from the open position, and during movement of said movable segment the folded position to the open position, said elastic portion is deformed and stretched for generating a restoring force to drive said movable segment to pivot to the open position from the folded position.

14. The temple as claimed in claim 13, wherein said elastic portion is configured as a wavy strip.

15. The temple as claimed in claim 14, wherein said elastic portion has two opposite end sections that are respectively connected to said fixed segment and said movable segment, and a middle section that interconnects said end sections and that has a V-shaped cross section.

16. The temple as claimed in claim 13, wherein:
   said fixed segment includes a main body having a rear end surface, and two rearward-extending ribs that are spaced apart from each other in the top-bottom direction, that extend rearwardly from said rear end surface of said main body of said fixed segment, and that cooperate with said main body of said fixed segment to define a front groove thereamong;
   said movable segment includes a main body having a front end surface, and two frontward-extending ribs that are spaced apart from each other in the top-bottom direction, that extend forwardly from said front end surface of said main body of said movable segment, and that cooperate with said main body of said movable segment to define a rear groove thereamong; and
   said elastic portion interconnects said rear end surface of said fixed segment and said front end surface of said movable segment, and spans said front groove and said rear groove.

17. The temple as claimed in claim 16, wherein said temple includes two of said connecting portions that are spaced apart from each other in the top-bottom direction, each of said connecting portions being integrally formed with and interconnecting a respective one of said rearward-extending ribs and a corresponding one of said frontward-extending ribs.

18. The temple as claimed in claim 17, wherein each of said rearward-extending ribs has a rear contacting surface that faces rearwardly, each of said frontward-extending ribs having a front contacting surface that is in contact with and parallel to said rear contacting surface of a corresponding one of said rearward-extending ribs when said movable segment is at the open position.

19. The temple as claimed in claim 18, wherein each of said connecting portions interconnects an inner side of said rear contacting surface of a corresponding one of said rearward-extending ribs and an inner side of said front contacting surface of a corresponding one of said frontward-extending ribs.

20. The temple as claimed in claim 17, wherein said elastic portion interconnects an inner side of said rear end surface of said fixed segment and an outer side of said front end surface of said movable segment.

* * * * *